United States Patent [19]
Aldenhoven et al.

[11] Patent Number: 5,367,511
[45] Date of Patent: Nov. 22, 1994

[54] SCANNING LENS MOUNT USING DEFLECTION AND TWISTING FOR SEPARATE MOVEMENTS

[75] Inventors: Ghislanus M. A. M. Aldenhoven, Hasselt,

[73] Assignee: U. S. Philips Corporation, New York, N.Y.

[21] Appl. No.: 84,835

[22] Filed: Jun. 29, 1993

[30] Foreign Application Priority Data

Jul. 1, 1992 [EP] European Pat. Off. ........ 92201962.5

[51] Int. Cl.⁵ .............................................. G11B 7/12
[52] U.S. Cl. ............................ 369/44.14; 369/44.15; 369/44.16; 359/814; 359/824
[58] Field of Search ............... 363/44.14, 44.15, 44.16, 363/44.11, 44.28, 44.41, 44.19, 44.22, 247; 359/813, 814, 823, 824

[56] References Cited

U.S. PATENT DOCUMENTS 5,073,883 12/1991 Mitsumori ........................ 365/44.15

FOREIGN PATENT DOCUMENTS

| 0153459 | 9/1985 | European Pat. Off. | ......... 369/44.16 |
| 0419097 | 3/1991 | European Pat. Off. | ......... 369/44.15 |
| 60-239941 | 11/1985 | Japan | ............................... 369/44.15 |
| 63-119026 | 5/1988 | Japan | ............................... 369/44.15 |

OTHER PUBLICATIONS

WO 91/01549, Feb. 7, 1991, PCT Application.

*Primary Examiner*—Aristotelis Psitos
*Assistant Examiner*—Muhammad Edun
*Attorney, Agent, or Firm*—David R. Treacy

[57] ABSTRACT

The objective lens of a scanning device is mounted in a movable section which is interconnected to a mounting section by two supports which extend parallel to each other and the lens axis and transverse to a direction of movement for correcting tracking errors. Each support has two first members, one movable and one fixed, having central portions fixed to the movable and mounting sections respectively, and two stiff second members connecting respective ends of the first members. Between the central portions and the ends, the first members are elastically deflectable to correct focussing errors, and elastically twistable to correct tracking errors.

20 Claims, 2 Drawing Sheets

SCANNING LENS MOUNT USING DEFLECTION AND TWISTING FOR SEPARATE MOVEMENTS

BACKGROUND OF THE INVENTION

The invention relates to an electro-optical scanning device comprising a mounting section, which is normally moved only to access different recording tracks and is hereinafter referred to as a stationary section, a section which is movable relative to said stationary section and which comprises a lens having an optical axis, and supporting means disposed between the stationary section and the movable section for movably supporting the movable section, which movable section is movable at least substantially along a first axis parallel to the optical axis, in order to form at least one radiation spot on a surface to be scanned, and at least substantially along a second axis oriented transversely of the optical axis, in order to follow a recording track in said surface, there being provided an electromagnetic actuator comprising first actuator means provided on the stationary section and second actuator means provided on the movable section, which actuator means cooperate magnetically with one another via an air gap in order to drive the movable section.

Such a scanning device is known from WO 91/01549 (herewith incorporated by reference). The known electro-optical scanning device has an objective lens for optically scanning a surface provided with information tracks. The objective lens, which has an optical axis, is mounted in a movably supported holder. The holder with the objective lens is movable parallel to the optical axis and parallel to the surface to be scanned. For this purpose the holder is pivotally connected to a support by means of two holding devices. The holding devices, which are wholly made of a plastics, each have two end pasts, two intermediate parts and two central parts, which pans are interconnected by plastics integral hinges. It is generally known that plastics exhibit a creep effect in the course of time, particularly at higher temperatures. In the known scanning device, in which the supporting device for the objective is wholly made of a plastics, the creep effect leads to deformations of the integral hinges and, consequently, to deviations of the position and the orientation of the objective lens relative to the originally established references.

An accurate support is of great importance in order to maintain the position in the tracking direction and the orientation of the lens relative to the information tracks during scanning because current scanning systems do not have a reference for this, so that no corrections can be made. Deviations of the position of the lens in the focusing direction can generally be corrected because most scanning systems use the position of the surface to be scanned as a reference for the focusing position of the objective lens, but such corrections lead to an increased power consumption. Particularly in battery-powered apparatuses, especially portable apparatuses, an unnecessary power consumption may be very undesirable.

SUMMARY OF THE INVENTION

It is an object of the invention to improve the scanning device of the type defined in the opening paragraph in such a manner that the position and the orientation of the lens remain accurately defined for a long time, even when the device is used under extreme conditions.

To this end the electro-optical scanning device in accordance with the invention is characterised in that the supporting means comprise two frame-shaped supports which extend parallel to one another. Between the mounting, or stationary, section, and the movable section, the supports oriented transversely of the first axis and the second axis. Each support comprises two elongate spaced-apart first elements which extend at least substantially parallel to the first axis, which can deflect elastically about a transverse axis parallel to the second axis and which can be twisted elastically about a longitudinal axis parallel to the first axis, and two elongate spaced-apart stiff second elements which couple said two first elements to one another, the first elements having their ends rigidly connected to the second elements. One of said two first elements has its central portion, which is situated between said two second elements, secured to the stationary section, and the other first element has its central portion, which is situated between said two second elements, secured to the movable section.

In the electro-optical scanning device in accordance with the invention all the elastic functions are associated with the first elements which are rigidly connected to the second elements. Consequently, the scanning device is highly resistant to torsion about a third axis extending transversely of said first and second axes. This has the advantage that it precludes an oblique position of the optical axis of the lens relative to the surface to be scanned and hence a variation of the radiation spot. In this respect it is to be noted that the radiation spot has a minimum size dictated by the wavelength of the light source used and the numeral aperture of the lens. The light in the radiation source has a central bright portion surrounded by concentric annular portions of substantially lower intensity. When the centre of the radiation spot is situated on a recording track some of the light will also impinge on the adjacent tracks. As a result of this, the reflected light contains not only the information relating to the relevant recording track but also some information relating to the adjacent tracks. Radiation-sensitive electronic means detect the reflected radiation beam in order to obtain electrical signals corresponding to the information in the reflected radiation. The resulting crosstalk between adjacent recording tracks depends to a significant extent upon the light distribution in the radiation spot on the recording surface. The light distribution in the radiation spot is influenced not only by the optical quality of the radiation source itself but also by the oblique position of the radiation beam relative to the sure, ace to be scanned. This is because the oblique position gives rise to coma and an increased light intensity to one side of the central portion. If the oblique position is oriented in a radial direction viewed from the axis of rotation of the rotating surface to be scanned this results in increased crosstalk between the recording track scanned by the radiation spot and an adjacent recording track.

The first elements in the scanning device in accordance with the invention can deflect while the lens performs focusing movements and can be twisted while the lens performs tracking movements. The first elements are made of a resilient material, such as a resilient plastics or a resilient metal, for example spring steel. The rigid second elements are preferably made of a plastics, in particular a plastics which can resist high temperatures. A suitable plastics for elements of both types is, for example, polycarbonate reinforced with carbon fibres. If the first elements are made of a metal their ends are preferably embedded in the second elements. The first elements are preferably integrated with the second elements if both types of elements are made of the same plastics. The frame-shaped supports are preferably injection-moulded products.

An embodiment of the electro-optical scanning device in accordance with the invention is characterised in that the first elements take the form of blade springs having a fiat surface extending parallel to the first axis and the second axis. First elements of this construction have a high resistance to twisting about a third axis oriented transversely of the first axis and the second axis. As a result of this, the scanning unit has an excellent torsional stiffness, so that in operation variations of the position of the scanning spot relative to the track to be scanned and thus variations of the shape of the scanning spot remain within narrow limits. This is of particular importance for uses in which both recording and reproduction are possible, as is the case with for example CD-R players.

An embodiment is characterised in that at the location of its central portion the first elements of each support each have a fixing member, one fixing member being secured to the stationary section and the other fixing member being secured to the movable section. Securing is possible, for example, by clamping.

In order to preclude an undesired dynamic behaviour of the scanning unit an embodiment is characterised in that the frame-shaped supports each comprise at least one damping element. The function of the damping element is to prevent possible resonances, particularly in the movable section.

A practical embodiment is characterised in that the damping element is a damping pad and is clamped between the central portion of a first element and an end portion of a second element.

The damping element may be affixed to the central portion by means of an adhesive, in particularly a glue. Rubber, in particular butyl or acrylic rubber, is found to be a suitable damping material.

An embodiment is characterised in that the end portion adjoins a central portion of the relevant second element and can deflect elastically relative to the central portion in a direction parallel to said first axis. This embodiment is advantageous in particular in the manufacturing process. Mounting of the damping elements is simple because during mounting of these damping elements the end portions can be deflected elastically in order to temporarily increase the clearance to the central portions of the first elements. The arrangement and the size of the end portions is such that this does not significantly affect the desired stiffness of the second elements.

An embodiment is characterised in that the end portion has a knife-shaped rib which faces the damping element and extends parallel to said second axis. This embodiment specifically damps parasitic resonances of the movable section during operation.

The invention further relates to a player comprising an electro-optical scanning device in accordance with the invention, as well as a turntable and a slide, the slide carrying the scanning device and being movable along a radial path relative to the turntable. The player may be constructed as an optical player, for example a CD player or CD-I player, or as a magneto-optical player, for example a CD-R player.

The invention will be described in more detail, by way of example, with reference to the drawings.

DESCRIPTION OF THE PREFERRED EMBODIMENT

Figure 1:
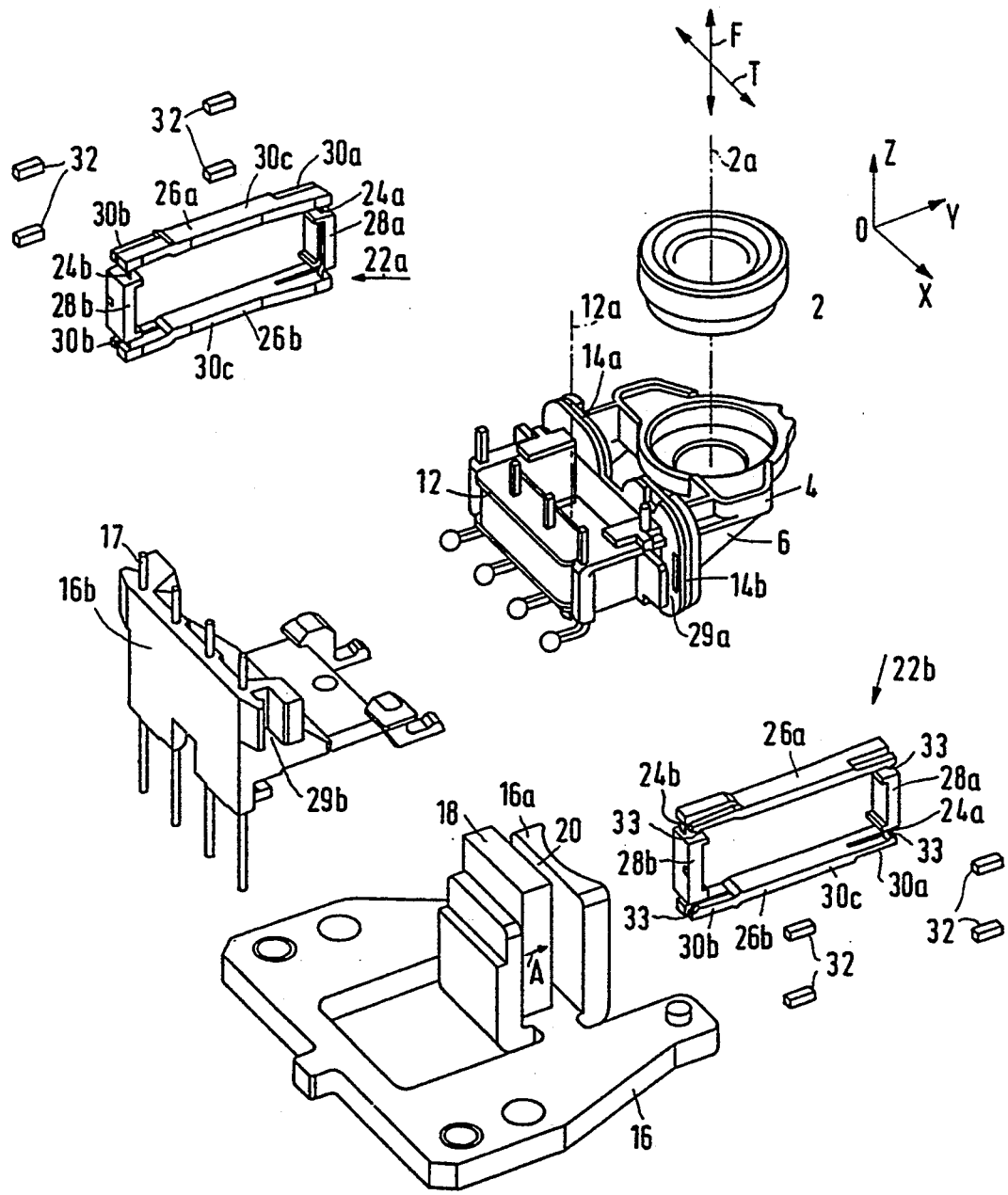
FIG. 1 is an exploded view of an embodiment of the scanning device in accordance with the invention.
Figure 2:
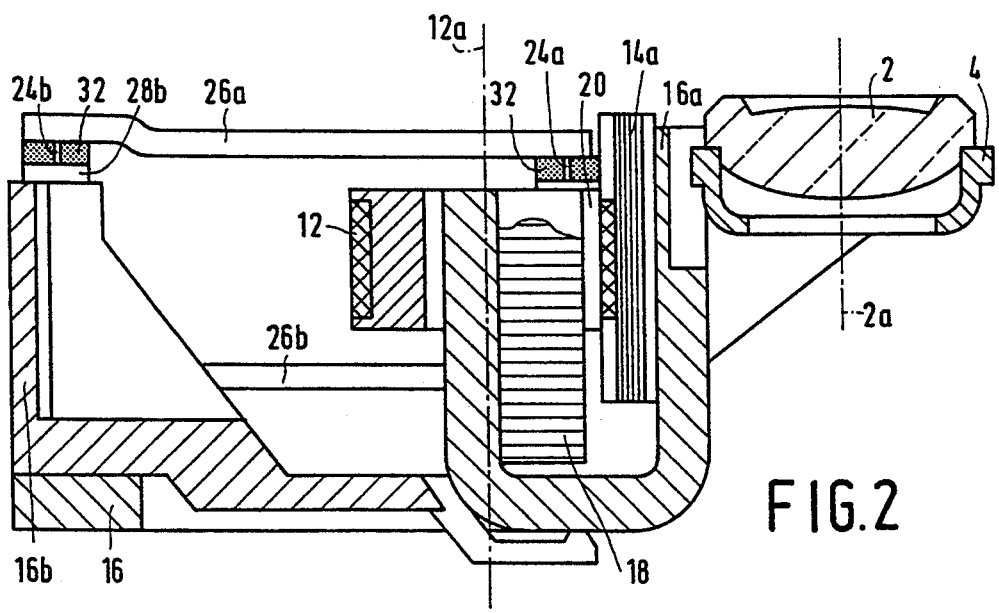
FIG. 2 is a sectional view of the embodiment shown in FIG. 1.

The electro-optical scanning device in accordance with the invention shown in FIGS. 1 and 2 is a so-called 2D actuator and is intended for use in CD decks constructed for two-stage radial tracking of optical discs, for example CDs of 8 or 12 cm diameter and/or magneto-optical discs. In such a deck an objective can be translated along a radial path relative to a disc which is rotatable about an axis of rotation. For this purpose the deck comprises, for example, a translatable slide carrying the scanning device. By means of a radiation beam obtained from a laser and directed to the scanning device an information track of a rotating disc-shaped medium can be written and/or read without mechanical contact.

The scanning device in accordance with the invention is constructed in such a manner that the production can be automated almost fully in order to manufacture large quantities at minimal cost.

The scanning device in accordance with the invention comprises an objective lens 2 mounted in a lens holder 4 and having an optical axis 2a. The lens holder 4 forms part of a movable section 6 of the scanning device, which movable section further comprises a holder for a focusing coil 12 having a coil axis 12a parallel to the optical axis 2a, and a holder for a tracking coil 14a and 14b respectively.

The scanning device in accordance with the invention further has a mounting or stationary section 16 comprising a permanent magnet 18 and ferromagnetic parts. The magnet 18, which has been magnetised as indicated by means of an arrow A, constitutes a magnetic circuit with the ferromagnetic parts of the stationary section 16, a magnetic air gap 20 being formed between the magnet 18 and one of the ferromagnetic parts 16a. The focusing coil 12 and the tracking coils 14a and 14b extend partly into the air gap 20 and together with the magnet 18 and said ferromagnetic parts they form an electromagnetic actuator. The stationary section 16 further comprises a plastics part 16b having anchoring pins 17 for the coils 12, 14a and 14b.

The movable section 6 is movably connected to the stationary section 16 with the aid of supporting means. The movable section, in particular the lens 2, is movable relative to the stationary section in focusing directions indicated by a double arrow F and in tracking directions indicated by a double arrow T. Relative to a system of orthogonal axes having an origin O and a Z axis parallel to the optical axis 2a a focusing direction corresponds to the Z axis and a tracking direction to the X axis.

The supporting means comprise two frame-shaped supports 22a and 22b, which are each oriented transversely of a plane defined by the X axis and the Z axis.

Each of the supports 22a and 22b comprises two first elements 24a and 24b in the form of blade springs and two elongate stiff second elements 26a and 26b. The first elements 24a and 24b, which are made of spring steel in the present example, have their ends embedded in the second elements 26a and 26b, which are made of a plastics, in the present example of polycarbonate. The first elements 24a and 24b have a flat surface extending parallel to the X axis and the Z axis and can deflect elastically about a transverse axis parallel to the X axis and can be twisted elastically about a longitudinal axis parallel to the Z axis. The first elements 24a and 24b each have a central portion encapsulated by a plastics fixing member 28a and 28b respectively, the fixing members 28a being secured to the movable section by means of a clamping construction 29a and the fixing members 28b being secured to the stationary section 16 by means of a clamping construction 29b.

Damping pads 32 are clamped between end portions 30a and 30b of the second elements 26a and 26b, and the fixing members 28a and 28b at the location of the central portions of the first elements 24a and 24b. At a side facing the damping pad each end portion 30a and 30b has a knife-shaped rib 33 which extends parallel to the X-axis and which presses resiliently against a damping pad. Both end portions 30a and 30b of each second element 26a and 26b can deform the damping pad as a result of the pivoting movement of the stiff central portion 30c which extends parallel to the Y axis of the defined system, and moves in a direction parallel to the Z axis for focusing, and parallel to the X axis for tracking correction.

It is to be noted that the first axis, the second axis and the third axis mentioned in the introductory pan of the description respectively correspond to the Z axis, the X axis and the Y axis of the defined system of orthogonal axes.

Figure 3:
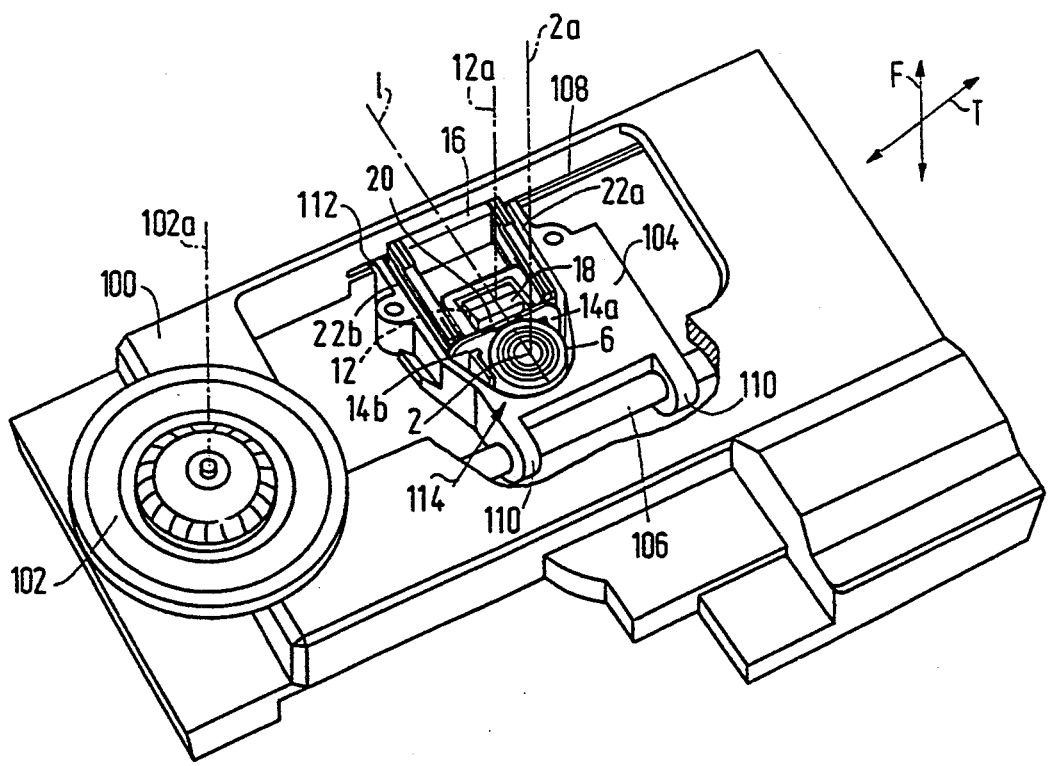
FIG. 3 is a perspective view of a player comprising a device in accordance with the invention.

FIG. 3 shows a pan of a CD player, in particular the deck of this player, employing an embodiment of the device in accordance with the invention. Parts of this embodiment which correspond to pans of the embodiment described above bear the same reference numerals.

The deck shown in FIG. 3 comprises a chassis 100 carrying a turntable 102, which can be driven by an electric motor, for supporting and centering an optical disc having an information track, for example a CD, the turntable 102 being rotatable about an axis of rotation 102a. The deck further comprises mechanical guide means for translating a slide 104 in a radial direction (indicated by an arrow T) relative to the turntable 102. The guide means comprise, for example, a guide rod 106 secured to the chassis 100 and a guide wall 108 which are adapted to cooperate respectively with sliding bushes 110 and sliding surfaces 112 of the slide 104. An electric motor, which is not shown and which is supported in the chassis, serves for driving the slide 104 directly or by means of a transmission mechanism.

The slide 104 cames an embodiment 114 of the scanning device in accordance with the invention and thus of the type as shown in FIGS. 1 and 2, and a semiconductor laser. The scanning device 114 comprises a movable section 6 comprising an objective 2 having an optical axis 2a parallel to the axis of rotation 102a, a focusing coil 12 having a coil axis 12a, and two tracking coils 14a, 14b. The movable section 6 is connected to a stationary section 16 of the scanning device 104 by means of two supports 22a and 22b, which stationary section is secured to the slide 104 and comprises a magnetic circuit with a permanent magnet 18 adjoining a gap 20. The scanning device is so positioned relative to the slide 107 that its longitudinal axis 1 is oriented transversely of a plane defined by the axis of rotation 102a and the optical axis 2a, thus enabling the objective 2 to be moved both in the focusing direction F and the tracking direction T. The gap 20 extends in a tangential direction relative to the turntable 102.

In operation the slide 104 is moved along a radial path, indicated by the arrow T, relative to the axis of rotation 102a of the turntable 102 in order to achieve coarse tracking of an information track situated in an information plane of the rotating disc. Since the track may be slightly off-centered on the optical disc clamped on the turntable and since the turntable may also exhibit small radial deviations allowance is to be made for small radial excursions of the information track during rotation. The deviations which in operation may arise between the position of the scanning spot projected onto the disc by the objective and the position of the track portion to be scanned are reduced by means of a radial tracking system forming part of the scanning device 114 in that the lens 2 performs small high-frequency tracking movements as indicated by the arrow T.

It is to be noted that the invention is not limited to the embodiment shown herein. For example, it is also possible to make the first elements of a plastics and to integrate them with the second elements, enabling supports wholly made of a plastics to be obtained. Moreover, it is to be noted that the supports are preferably injection-moulded products.

We claim:

1. An electro-optical scanning device comprising:
   a mounting section,
   a movable section comprising a lens having an optical axis,
   supporting means interconnecting said mounting section and said movable section, for supporting said movable section for movement relative to said mounting section in a first direction at least substantially along a first axis parallel to said optical axis to form at least one radiation spot on a surface to be scanned, and in a second direction at least substantially along a second axis transverse to said first axis to follow a recording track in said surface, and
   an actuator comprising first actuator means provided on said mounting section and second actuator means provided on said movable section for driving said movable section in said first and second directions,
   characterized in that supporting means comprises two supports which extend parallel to each other,
   each support respectively comprises two elongate first elements which extend at least substantially parallel to said first axis and are spaced apart in a direction transverse to said first axis, each first element having two ends and a central portion; and two elongate stiff second elements for coupling said first elements to each other, each second element being rigidly connected to a respective end of each first element of the respective support,
   the central portion of one of the first elements of each support is secured to the mounting section, and the central portion of the other of the first elements of each support is secured to the movable section, and each of said first elements is elastically deflectable about at least one transverse axis parallel to said second axis for movement of said movable section in said first direction, and elastically twistable about a respective longitudinal axis for movement of said movable section in said second direction.

2. A device as claimed in claim 1, characterized in that said first elements comprise respective blade springs each having a flat surface extending parallel to said first axis and to said second axis.

3. A device as claimed in claim 1, characterized in that said first elements are made of a resilient material.

4. A device as claimed in claim 1, characterized in that said first elements are made of a reinforced plastic material.

5. A device as claimed in claim 4, characterized in that said first elements are made of a metal, and said ends are embedded in the respective second elements.

6. A device as claimed in claim 4, characterized in that said first elements are made of a reinforced plastic material and are integrated with the respective second elements.

7. A device as claimed in claim 6, wherein each of said supports comprises a damping element, characterized in that at least one of said second elements has an end portion, and said damping element is a damping pad which is clamped between the central portion of a first element and said end portion.

8. A device as claimed in claim 7, characterized in that said end portion has a knife-shaped rib which faces said damping pad and extends parallel to said second axis.

9. An electro-optical scanning device comprising:
a mounting section,
a movable section comprising a lens having an optical axis,
supporting means interconnecting said mounting section and said movable section, for supporting said movable section for movement relative to said mounting section in a first direction at least substantially along a first axis parallel to said optical axis to form at least one radiation spot on a surface to be scanned, and in a second direction at least substantially along a second axis transverse to said first axis to follow a recording track in said surface, and
an actuator comprising first actuator means provided on said mounting section and second actuator means provided on said movable section for driving said movable section in said first and second directions,
characterized in that supporting means comprises two supports which extend parallel to each other,
each support respectively comprises two elongate first elements which extend at least substantially parallel to said first axis and are spaced apart in a direction transverse to said first axis, each first element having two ends and a central portion; two fixing members; and two elongate stiff second elements for coupling said first elements to each other, each second element being rigidly connected to a respective end of each first element of the respective support,
the central portion of one of the first elements of each support is secured to the mounting section, by one of fixing members, and the central portion of the other of the first elements of each support is secured to the movable section by the other of said fixing member, and
each of said first elements comprises a respective blade spring having a flat surface extending parallel to said first axis and to said second axis, said blade spring being elastically deflectable between the respective fixing member and a respective end of the first element about a respective transverse axis parallel to said second axis for movement of said movable section in said first direction, and elastically twistable about a respective longitudinal axis for movement of said movable section in said second direction.

10. A device as claimed in claim 9, characterized in that said second elements are made of a reinforced plastic material.

11. A device as claimed in claim 10, characterized in that said blade springs are made of a metal, and said ends are embedded in the respective second elements.

12. A device as claimed in claim 10, characterized in that said first elements are made of a reinforced plastic material and are integrated with the respective second elements.

13. A device as claimed in claim 9, wherein each of said supports comprises a damping element, characterized in that at least one of said second elements has an end portion, and said damping element is a damping pad which is clamped between one of said fixing members and said end portion.

14. A device as claimed in claim 13, characterized in that said blade springs are made of a metal, and said ends are embedded in the respective second elements.

15. A device as claimed in claim 13, characterized in that said end portion has a knife-shaped rib which faces said damping pad and extends parallel to said second axis.

16. A device as claimed in claim 15, characterized in that said blade springs are made of a metal, and said ends are embedded in the respective second elements.

17. A device as claimed in claim 15, characterized in that said second elements are made of a reinforced plastic material, and said first elements are made of a reinforced plastic material and are integrated with the respective second elements.

18. An optical player comprising a turntable, an electro-optical scanning device, and a slide, the slide carrying the scanning device and being movable along a radial path relative to the turntable, wherein the electro-optical scanning device comprises:
a mounting section,
a movable section comprising a lens having an optical axis,
supporting means interconnecting said mounting section and said movable section, for supporting said movable section for movement relative to said mounting section in a first direction at least substantially along a first axis parallel to said optical axis to form at least one radiation spot on a surface to be scanned, and in a second direction at least substantially along a second axis parallel to said radial path, and
an actuator comprising first actuator means provided on said mounting section and second actuator means provided on said movable section for driving said movable section in said first and second directions,
characterized in that supporting means comprises two supports which extend parallel to each other, each support respectively comprises two elongate first elements which extend at least substantially parallel to said first axis and are spaced apart in a direction transverse to said first axis, each first element having two ends and a central portion; and two elongate stiff second elements for coupling said first elements to each other, each second element being rigidly connected to a respective end of each first element of the respective support, the central portion of one of the first elements of each support is secured to the mounting section, and the central portion of the other of the first elements of each support is secured to the movable section, and each of said first elements is elastically deflectable about at least one transverse axis parallel to said second axis for movement of said movable section in said first direction, and elastically twistable about a respective longitudinal axis for movement of said movable section in said second direction.

19. A player as claimed in claim 18, characterized in that each support comprises two fixing members, the central portion of said one of the first elements of each support is secured to the mounting section by one of fixing members, and the central portion of said other of the first elements of each support is secured to the movable section by the other of said fixing members, and each of said first elements comprises a respective blade sprig defining a longitudinal axis and having a flat surface extending parallel to said first axis and to said second axis, said blade spring being elastically deflectable between the respective fixing member and a respective end of the first element about a respective transverse axis parallel to said second axis for movement of said movable section in said first direction, and elastically twistable about said longitudinal axis for movement of said movable section in said second direction.

20. A device as claimed in claim 19, wherein each of said supports comprises a damping element, characterized in that at least one of said second elements has an end portion, and said damping element is a damping pad which is clamped between one of said fixing members and said end portion.

* * * * *